US012630224B2

(12) United States Patent
Boaventura de Souza et al.

(10) Patent No.: US 12,630,224 B2
(45) Date of Patent: May 19, 2026

(54) VEHICLE DEFORMATION STRUCTURE

(71) Applicant: Volvo Truck Corporation, Gothenburg (SE)

(72) Inventors: Leonardo Boaventura de Souza, Gothenburg (SE); Erik Wikblom, Gothenburg (SE); Avinash Thirtharajan, Bangalore Karnataka (IN); Erik Ejdervik, Gothenburg (SE); Mikael Boisen, Gothenburg (SE); Jonas Björkenfors, Trollhättan (SE)

(73) Assignee: Volvo Truck Corporation, Gothenburg (SE)

( * ) Notice: Subject to any disclaimer, the term of this patent is extended or adjusted under 35 U.S.C. 154(b) by 338 days.

(21) Appl. No.: 18/442,321

(22) Filed: Feb. 15, 2024

(65) Prior Publication Data

US 2024/0278840 A1     Aug. 22, 2024

(30) Foreign Application Priority Data

Feb. 22, 2023     (EP) .................................... 23158015

(51) Int. Cl.
B62D 21/15        (2006.01)
B62D 21/03        (2006.01)
B62D 21/11        (2006.01)

(52) U.S. Cl.
CPC ........... B62D 21/152 (2013.01); B62D 21/03 (2013.01); B62D 21/11 (2013.01)

(58) Field of Classification Search
CPC ....... B62D 21/152; B62D 21/03; B62D 21/11
See application file for complete search history.

(56) References Cited

U.S. PATENT DOCUMENTS

| | | | | |
|---|---|---|---|---|
| 9,956,991 | B1 * | 5/2018 | Nishikawa | ............. B62D 21/11 |
| 11,001,308 | B2 | 5/2021 | Atsumi et al. | |
| 2021/0179176 | A1 | 6/2021 | Kim | |

FOREIGN PATENT DOCUMENTS

| | | | | |
|---|---|---|---|---|
| CN | 101678861 A | * | 3/2010 | ........... B62D 25/087 |
| CN | 214689769 U | | 11/2021 | |

(Continued)

OTHER PUBLICATIONS

Extended European Search Report for European Patent Application No. 23158015.0, mailed Jul. 21, 2023, 6 pages.

*Primary Examiner* — Faye M Fleming
(74) *Attorney, Agent, or Firm* — Withrow & Terranova, PLLC

(57)        ABSTRACT

A vehicle deformation structure for protecting vehicle electric driveline components during a collision, the vehicle deformation structure comprising a pair of diagonally extending frame elements, wherein a first diagonally extending frame element extends between a first end portion of a first front frame element and a second end portion of a first rear frame element, and a second diagonally extending frame element extends between a first end portion of a second front frame element and a second end portion of a second rear frame element, wherein the first diagonally extending frame element is attached to a first intermediate frame element at a position between first and second end portions of the first intermediate frame element, and the second diagonally extending frame element is attached to a second intermediate frame element at a position between first and second end portions of the second intermediate frame element.

15 Claims, 3 Drawing Sheets

10

30

100     20

(56) References Cited

FOREIGN PATENT DOCUMENTS

| EP | 3444138 | A1 | 2/2019 |
| EP | 3696057 | A1 | 8/2020 |
| WO | 2021209217 | A1 | 10/2021 |

* cited by examiner

VEHICLE DEFORMATION STRUCTURE

PRIORITY APPLICATIONS

The present application claims priority to European Patent Application No. 23158015.0, filed on Feb. 22, 2023, and entitled "VEHICLE DEFORMATION STRUCTURE," which is incorporated herein by reference in its entirety.

TECHNICAL FIELD

The disclosure relates generally to vehicle structures protecting sensitive components during a collision. In particular aspects, the disclosure relates to a vehicle deformation structure for protecting vehicle electric driveline components during a collision. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

During collisions, in particularly frontal collisions, the energy resulting from such collision should preferably be absorbed by a vehicle deformation structure to both protect sensitive vehicle components as well as persons occupied in the cab. In a vehicle propelled by an internal combustion engine, the internal combustion engine itself may serve as such vehicle deformation structure.

However, for electrically propelled vehicles, the energy generated during a collision may be higher than the energy generated during a collision with a vehicle propelled by an internal combustion engine. This is primarily due to the lower mass provided at the front of the vehicle. This requires the use of other structures to protect the sensitive components and to absorb the energy during a collision, and there is thus a desire to further improve and provide such structure, especially for electrically propelled vehicles.

SUMMARY

According to a first aspect of the disclosure, there is provided a vehicle deformation structure for protecting vehicle electric driveline components during a collision, the vehicle deformation structure comprising a pair of front frame elements, each of the front frame elements extending vertically between a first end portion and a second end portion of the front frame element, a pair of rear frame elements, each of the rear frame elements extending vertically between a first end portion and a second end portion of the rear frame element, a pair of intermediate frame elements, wherein a first intermediate frame element is positioned between a first front frame element and a first rear frame element, and a second intermediate frame element is positioned between a second front frame element and a second rear frame element, each of the intermediate frame elements extending vertically between a first end portion and a second end portion of the intermediate frame element, and a pair of diagonally extending frame elements, wherein a first diagonally extending frame element extends between the first end portion of the first front frame element and the second end portion of the first rear frame element, and a second diagonally extending frame element extends between the first end portion of the second front frame element and the second end portion of the second rear frame element, wherein the first diagonally extending frame element is attached to the first intermediate frame element at a position between the first and second end portions of the first intermediate frame element, and the second diagonally extending frame element is attached to the second intermediate frame element at a position between the first and second end portions of the second intermediate frame element. The first aspect of the disclosure may seek to protect vehicle components arranged at a front end of the vehicle during a collision, in particular during a frontal collision. A technical benefit may include that the vehicle deformation structure can provide for an improved module protecting crash sensitive components. In particular, by using a pair of diagonally extending frame elements which is attached at three positions, i.e. to the front frame element, the rear frame element and to the intermediate frame element, a longitudinal rear zone of the vehicle deformation structure between the pair of intermediate frame elements and the pair of rear frame elements can be well protected during a collision. This is due to the fact that the deformation can be focused to a longitudinal front zone between the pair of front frame elements and the pair of intermediate frame elements. Put it differently, the longitudinal front zone is structurally deformed during a collision while the longitudinal rear zone is kept more or less intact. The generated energy during a collision is thus absorbed primarily by the longitudinal front zone. Also, the diagonally extending frame elements will deform in a transversal direction away from each other. Thus, the volume formed inside the longitudinal front zone will be protected. The diagonally extending frame elements are preferably attached at a transversal outer side to the intermediate frame elements, respectively.

In some examples, including in at least one preferred example, optionally the first end portion of each of the front frame elements, the rear frame elements and the intermediate frame elements may be an upper end portion. By upper end portion should be construed as upper in a vertical direction when the vehicle deformation structure is connected to the vehicle.

In some examples, including in at least one preferred example, optionally the second end portion of each of the front frame elements, the rear frame elements and the intermediate frame elements may be a lower end portion. By lower end portion should be construed as lower in a vertical direction when the vehicle deformation structure is connected to the vehicle.

In some examples, including in at least one preferred example, optionally, the first diagonally extending frame element may be attached to the first intermediate frame element at a first attachment position and the second diagonally extending frame element may be attached to the second intermediate frame element at a second attachment position, wherein the distance from the first end portion of the first intermediate frame element to the first attachment position corresponds to the distance from the first end portion of the second intermediate frame element to the second attachment position. A technical benefit may include that the pair of diagonally extending frame elements are symmetrically attached to the pair of intermediate frame elements, thereby enabling for a uniform deformation during a frontal collision.

In some examples, including in at least one preferred example, optionally, the vehicle deformation structure may be connectable to a transverse cross member of the vehicle. The cross member should preferably be construed as a member of the vehicle which is designed to withstand relatively large loads. The cross member is preferably connected between a pair of longitudinally extending frame rails of the vehicle. A technical benefit may include that the transfer of load during a collision from the cross member into the vehicle deformation structure can be obtained.

In some examples, including in at least one preferred example, optionally, the vehicle deformation structure may comprise a pair of front suspension members configured to connect the vehicle deformation structure to the transverse cross member of the vehicle. The front suspension members may also be referred to as front cushions which may advantageously provide for a well-defined attachment between the vehicle deformation structure and the cross member.

In some examples, including in at least one preferred example, optionally, a first front suspension member may be arranged in the vicinity of the second end portion of the first front frame element and the second front suspension member may be arranged in the vicinity of the second end portion of the second front frame element. In the vicinity should here preferably be construed as close to, and the first and second front suspension members are thus preferably arranged closer to the second end portion of the first and second front frame elements, respectively, compared to the first end portion of the first and second front frame elements. Preferably, the first and second front suspension members are preferably connected either directly to the second end portions or to a structure which is connected to the second end portions.

In some examples, including in at least one preferred example, optionally, the vehicle deformation structure may be connectable to a pair of longitudinally extending frame rails of the vehicle. A technical benefit may include that the vehicle deformation structure is attached to a rigid structure of the vehicle.

In some examples, including in at least one preferred example, optionally, the vehicle deformation structure may comprise a pair of rear suspension members configured to connect the vehicle deformation structure to the longitudinally extending frame rails of the vehicle. The rear suspension members may also be referred to as rear cushions which may advantageously provide for a well-defined attachment between the vehicle deformation structure and the longitudinally extending frame rails.

In some examples, including in at least one preferred example, optionally, a first rear suspension member may be arranged in the vicinity of the second end portion of the first rear frame element and a second rear suspension member may be arranged in the vicinity of the second end portion of the second rear frame element. In the vicinity should here preferably be construed as close to, and the first and second rear suspension members are thus preferably arranged closer to the second end portion of the first and second rear frame elements, respectively, compared to first end portion of the first and second front frame elements. Preferably, the first and second rear suspension members are preferably connected either directly to the second end portions or to a structure which is connected to the second end portions.

In some examples, including in at least one preferred example, optionally, the vehicle deformation structure may further comprise a first upper longitudinally extending frame element attached to the first end portion of the first front frame element and to the first end portion of the first rear frame element. A technical benefit may be that the stiffness of the vehicle deformation structure can be further improved.

In some examples, including in at least one preferred example, optionally, the first upper longitudinally extending frame element may be attached to the first end portion of the first intermediate frame element. A technical benefit may be that the stiffness of the vehicle deformation structure can be further improved. In particular, the above described longitudinal rear zone may be kept even further intact during a collision.

In some examples, including in at least one preferred example, optionally, the vehicle deformation structure may further comprise a second upper longitudinally extending frame element attached to the first end portion of the second front frame element and to the first end portion of the second rear frame element. A technical benefit may be that the stiffness of the vehicle deformation structure can be further improved.

In some examples, including in at least one preferred example, optionally, the second upper longitudinally extending frame element may be attached to the first end portion of the second intermediate frame element. A technical benefit may be that the stiffness of the vehicle deformation structure can be further improved. In particular, the above described longitudinal rear zone may be kept even further intact during a collision.

In some examples, including in at least one preferred example, optionally, the vehicle deformation structure may further comprise a first lower longitudinally extending frame element attached to the second end portion of the first front frame element and to the second end portion of the first rear frame element. A technical benefit may be that the stiffness of the vehicle deformation structure can be further improved.

In some examples, including in at least one preferred example, optionally, the first lower longitudinally extending frame element may be attached to the second end portion of the first intermediate frame element.

In some examples, including in at least one preferred example, optionally, the vehicle deformation structure may further comprise a second lower longitudinally extending frame element attached to the second end portion of the second front frame element and to the second end portion of the second rear frame element. A technical benefit may be that the stiffness of the vehicle deformation structure can be further improved.

In some examples, including in at least one preferred example, optionally, the second lower longitudinally extending frame element may be attached to the second end portion of the second intermediate frame element.

In some examples, including in at least one preferred example, optionally, the vehicle deformation structure may further comprise a front transverse frame element attached to the first end portion of the first front frame element and to the first end portion of the second front frame element. A technical advantage may be that the transversal stiffness of the vehicle deformation structure may be improved, in particular at the front end thereof.

In some examples, including in at least one preferred example, optionally, the vehicle deformation structure may further comprise a rear transverse frame element attached to the first end portion of the first rear frame element and to the first end portion of the second rear frame element. A technical advantage may be that the transversal stiffness of the vehicle deformation structure may be improved, in particular at the rear end thereof.

In some examples, including in at least one preferred example, optionally, the vehicle deformation structure may further comprise an intermediate transverse frame element attached to the first end portion of the first intermediate frame element and to the first end portion of the second intermediate frame element. A technical advantage may be that the transversal stiffness of the vehicle deformation structure may be improved, in particular at the mid-section thereof.

The above described vertically extending frame elements, the diagonally extending frame elements, the longitudinally extending frame elements and the transversal frame elements may advantageously form a box-shaped vehicle deformation structure. A technical advantage of such box-shape may enable for an increased stiffness in vertical, longitudinal and transversal directions.

According to a second aspect of the disclosure, there is provided a vehicle, comprising at least one electric traction motor, and a vehicle deformation structure according to any one of the preceding claims, wherein at least one driveline component connected to the at least one electric traction motor is arranged in the vehicle deformation structure.

Effects and features of the second aspect are largely analogous to those described above in relation to the first aspect.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

The disclosure described in the following may seek to mitigate the problem of damaged vehicle components during a collision, in particular during a frontal collision. A technical benefit may thus include that the vehicle deformation structure described in the following may provide for an improved protection for crash sensitive components.

Figure 1:
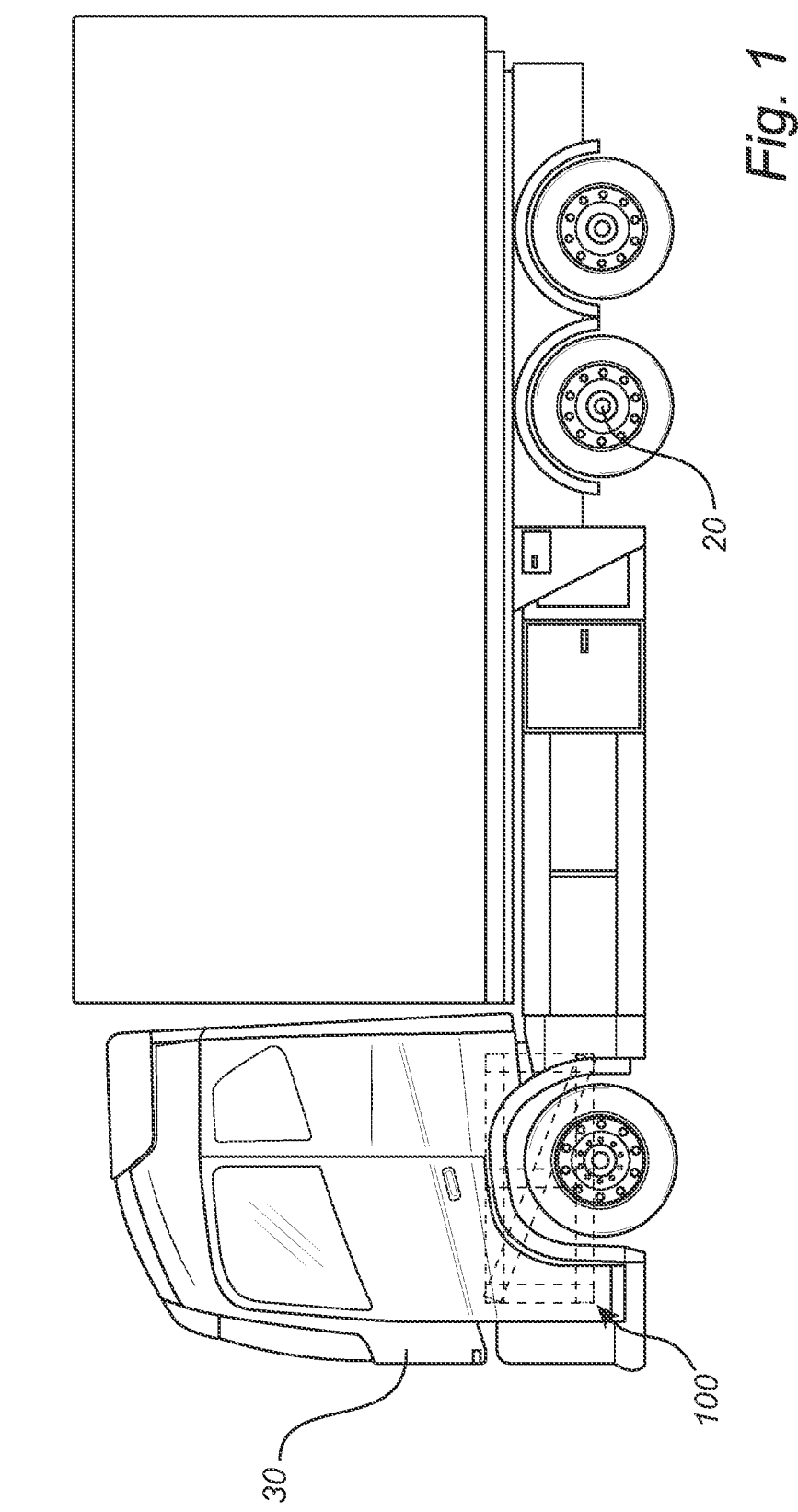
FIG. 1 is an exemplary illustration of a vehicle exemplified as a truck according to an example.

Initial reference is made to FIG. 1 which is an exemplary illustration of a vehicle 10 exemplified as a truck according to an example. The vehicle 10 is preferably an electrically propelled vehicle comprising at least one electric machine 20. Such electrically propelled vehicle 10 may be a battery electric vehicle (BEV), a fuel cell electric vehicle (FCEV), or a hybrid electric vehicle. As further exemplified in FIG. 1, the vehicle 10 comprises a vehicle deformation structure 100. The vehicle deformation structure 100 is preferably positioned in the front end of the vehicle 10 under a cabin 30 of the vehicle 10. The vehicle deformation structure 100 is thus preferably arranged at a position of which an internal combustion engine (ICE) is positioned for a conventional ICE propelled vehicle.

The vehicle deformation structure 100 may advantageously protect components which are sensitive for deformation during a collision. In particular, the vehicle deformation structure 100 may preferably house and protect components that are forming part of the electric driveline of the vehicle 10, or that are assisting the electric driveline of the vehicle 10. Such component may be, but not exclusively to, thermal distribution unit(s), an electric vehicle air compressor (EVAC), an electrical hydraulic servo pump (EHPS), an air tank, a DC/DC converter, a battery, etc.

Figure 2:
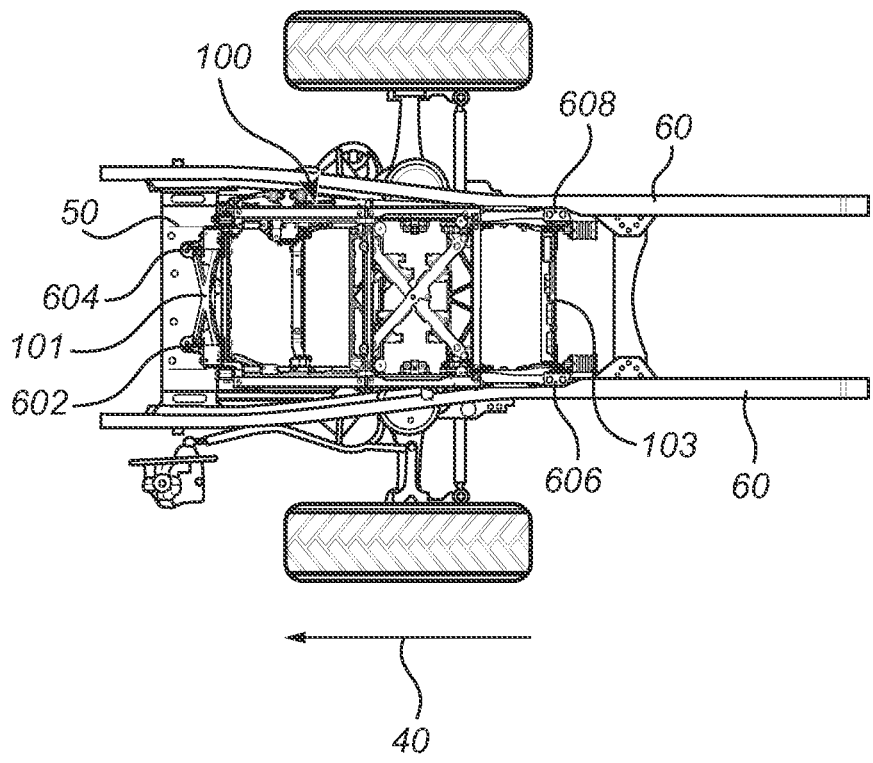
FIG. 2 is a schematic exemplified top view illustration of a vehicle deformation structure attached to the vehicle according to an example.
Figure 3:
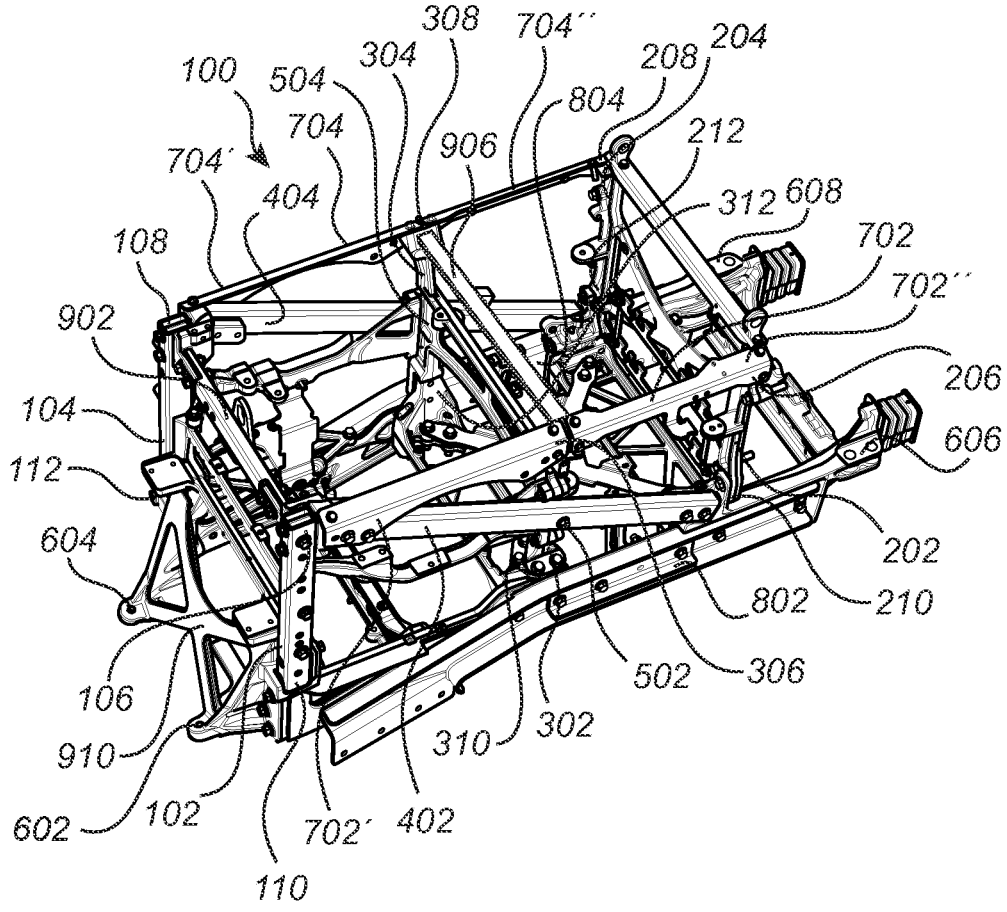
FIG. 3 is a schematic perspective view of the vehicle deformation structure according to an example.

In order to describe the vehicle deformation structure 100 in further detail, reference is made to FIGS. 2 and 3. Starting with FIG. 2 which is a schematic exemplified top view illustration of the vehicle deformation structure 100 attached to the vehicle 10 according to an example. The vehicle deformation structure 100 comprises a front end 101 and a rear end 103 as seen in a longitudinal direction 40 of the vehicle 10. At the front end 101, the vehicle deformation structure 100 is attached to a transverse cross member 50 of the vehicle 10. In particular, the vehicle deformation structure 100 comprises a pair of front suspension members 602, 604 connecting the vehicle deformation structure 100 to the transverse cross member 50 of the vehicle 10.

Further, at the rear end 103, the vehicle deformation structure 100 is attached to a pair of longitudinally extending frame rails 60 of the vehicle 10. In particular, the vehicle deformation structure 100 comprises a pair of rear suspension members 606, 608 connecting the vehicle deformation structure 100 to the longitudinally extending frame rails 60 of the vehicle 10.

To describe the vehicle deformation structure 100 in even further detail, reference is made to FIG. 3 which is a schematic perspective view of the vehicle deformation structure 100 according to an example.

As is depicted in FIG. 3, the vehicle deformation structure 100 is preferably arranged as a box-shaped structure. The vehicle deformation structure 100 comprises a pair of front frame elements 102, 104, i.e. a first front frame element 102 and a second front frame element 104. Each of the front frame elements 102, 104 extends vertically between a first end portion 106, 108 and a second end portion 110, 112 of the front frame elements 102, 104, respectively. The first end portions 106, 108 are preferably a respective upper end portion of the front frame elements 102, 104 as seen in a vertical direction of the vehicle 10 when the vehicle deformation structure 100 is attached to the vehicle 10 as depicted in FIG. 2, while the second end portions 110, 112 are preferably a respective lower end portion of the front frame elements 102, 104.

The vehicle deformation structure 100 further comprises a pair of rear frame elements 202, 204, i.e. a first rear frame element 202 and a second rear frame element 204. Each of the rear frame elements 202, 204 extends vertically between a first end portion 206, 208 and a second end portion 210, 212 of the rear frame elements 202, 204, respectively. The first end portions 206, 208 are preferably a respective upper end portion of the rear frame elements 202, 204 as seen in a vertical direction of the vehicle 10 when the vehicle deformation structure 100 is attached to the vehicle 10 as depicted in FIG. 2, while the second end portions 210, 212 are preferably a respective lower end portion of the rear frame elements 202, 204.

Moreover, the vehicle deformation structure 100 also comprises a pair of intermediate frame elements 302, 304, i.e. a first intermediate frame element 302 and a second intermediate frame element 304. As depicted in FIG. 3, the first intermediate frame element 302 is positioned between the first front frame element 102 and the first rear frame element 202 as seen in the longitudinal direction 40 (FIG. 2), while the second intermediate frame element 304 is positioned between the second front frame element 104 and the second rear frame element 204. Each of the intermediate frame elements 302, 304 extends vertically between a first end portion 306, 308 and a second end portion 310, 312 of the intermediate frame elements 302, 304, respectively.

Still further, the vehicle deformation structure 100 comprises a pair of diagonally extending frame elements 402, 404, i.e. a first diagonally extending frame element 402 and a second diagonally extending frame element 404. In particular, the pair of diagonally extending frame elements 402, 404 extends in the longitudinal direction and in the vertical direction. As depicted in FIG. 3, the first diagonally extending frame element 402 extends between the first end portion 106 of the first front frame element 102 and the second end portion 210 of the first rear frame element 202. In a similar vein, the second diagonally extending frame element 404 extends between the first end portion 108 of the second front frame element 104 and the second end portion 212 of the second rear frame element 104. Further, the first diagonally extending frame element 402 is also attached to the first intermediate frame element 302 at a position between the first 306 and second 310 end portions of the first intermediate frame element. In a similar vein, the second diagonally extending frame element 404 is attached to the second intermediate frame element 304 at a position between the first 308 and second 312 end portions of the second intermediate frame element 304.

Accordingly, the pair of diagonally extending frame elements 402, 404 is attached to a respective one of the first 302 and the second 304 intermediate frame elements. More particularly, the first diagonally extending frame element 402 may preferably be attached to the first intermediate frame element 302 at a first attachment position 502. In a similar vein, the second diagonally extending frame element 404 may preferably be attached to the second intermediate frame element 304 at a second attachment position 504. A distance from the first end portion 306 of the first intermediate frame element 302 to the first attachment position 502 may preferably correspond to the distance from the first end portion 308 of the second intermediate frame element 304 to the second attachment position 504.

Moreover, and as exemplified in FIG. 3, the vehicle deformation structure 100 may preferably comprise a first upper longitudinally extending frame element 702. The first upper longitudinally extending frame element 702 is attached to the first end portion 106 of the first front frame element 102 and to the first end portion 206 of the first rear frame element 202. The first upper longitudinally extending frame element 702 is also preferably attached to the first end portion 306 of the first intermediate frame element 302. As exemplified in FIG. 3, the first upper longitudinally extending frame element 702 may comprise two upper longitudinally extending frame elements 702', 702", where a first one 702' of the two upper longitudinally extending frame elements is connected between the first end portion 106 of the first front frame element 102 and the first end portion 306 of the first intermediate frame element 302, while the second one 702" of the two upper longitudinally extending frame elements is connected between the first end portion 306 of the first intermediate frame element 302 and the first end portion 206 of the first rear frame element 202. It should however be readily understood that the first upper longitudinally extending frame element 702 may be one single frame element attached to the first end portions of the first front frame element 102, the first intermediate frame element 302 and the first rear frame element 202.

Also, the vehicle deformation structure 100 may preferably comprise a second upper longitudinally extending frame element 704. The second upper longitudinally extending frame element 704 is attached to the first end portion 108 of the second front frame element 104 and to the first end portion 208 of the second rear frame element 204. The second upper longitudinally extending frame element 704 is also preferably attached to the first end portion 308 of the second intermediate frame element 304. As exemplified in FIG. 3, the second upper longitudinally extending frame element 704 may comprise two upper longitudinally extending frame elements 704', 704", where a first one 704' of the two upper longitudinally extending frame elements is connected between the first end portion 108 of the second front frame element 104 and the first end portion 308 of the second intermediate frame element 304, while the second one 704" of the two upper longitudinally extending frame elements is connected between the first end portion 308 of the second intermediate frame element 304 and the first end portion 208 of the second rear frame element 204. It should however be readily understood that the second upper longitudinally extending frame element 704 may be one single frame element attached to the first end portions of the second front frame element 104, the second intermediate frame element 304 and the second rear frame element 204.

Still further, the vehicle deformation structure 100 may also advantageously comprise a first lower longitudinally extending frame element 802. The first lower longitudinally extending frame element 802 is attached to the second end portion 110 of the first front frame element 102 and to the second end portion 210 of the first rear frame element 202. Advantageously, the first lower longitudinally extending frame element 802 may also be attached to the second end portion 310 of the first intermediate frame element 302. In a similar vein, the vehicle deformation structure 100 may also advantageously comprise a second lower longitudinally extending frame element 804. The second lower longitudinally extending frame element 804 is attached to the second end portion 112 of the second front frame element 104 and to the second end portion 212 of the second rear frame element 204. Advantageously, the second lower longitudinally extending frame element 804 may also be attached to the second end portion 312 of the second intermediate frame element 304.

Furthermore, the vehicle deformation structure 100 may also, as exemplified in FIG. 3, comprise a front transverse frame element 902, a rear transverse frame element 904 and an intermediate transverse frame element 906. The front transverse frame element 902 is attached to the first end portion 106 of the first front frame element 102 and to the first end portion 108 of the second front frame element 104. The rear transverse frame element 904 is attached to the first end portion 206 of the first rear frame element 202 and to the first end portion 208 of the second rear frame element 204. The intermediate transverse frame element 906 is attached to the first end portion 306 of the first intermediate frame element 302 and to the first end portion 308 of the second intermediate frame element 304.

Moreover, and as indicated above in relation to the description of FIG. 2, the vehicle deformation structure 100 may advantageously comprise the first 602 and second 604 front suspension members connecting the vehicle deformation structure 100 to the transverse cross member (50 in FIG. 2). As illustrated in FIG. 3, the first front suspension member 602 is arranged in the vicinity of the second end portion 110 of the first front frame element 102, while the second front suspension member 604 is arranged in the vicinity of the second end portion 112 of the second front frame element 104. As exemplified in FIG. 3, the first 602 and second 604 front suspension members may be arranged on a X-beam 910 located at the front end (101 in FIG. 2) of the vehicle deformation structure 100. The X-beam 910 is in turn attached at least to the first 102 and second 104 front frame elements.

As also indicated above in relation to the description of FIG. 2, the vehicle deformation structure 100 may advantageously comprise the first 606 and second 608 rear suspension members connecting the vehicle deformation structure 100 to the longitudinally extending frame rails of the vehicle (60 in FIG. 2). As illustrated in FIG. 3, the first rear suspension member 606 is arranged in the vicinity of the second end portion 210 of the first rear frame element 202, while the second rear suspension member 608 is arranged in the vicinity of the second end portion 212 of the second rear frame element 204. As exemplified in FIG. 3, the first 606 and second 608 rear suspension members may be arranged at the rear end (103 in FIG. 2) of the vehicle deformation structure 100. In FIG. 3, the first rear suspension member 606 is arranged at a rear end of the first lower longitudinally extending frame element 802, while the second rear suspension member 608 is arranged at a rear end of the second lower longitudinally extending frame element 804.

The above described elements should preferably be made of metal. These metal parts should preferably be of sufficient strength to bear the load applied during a collision and to deform in a desired manner. The elements may be made of a e.g. steel, spheroidal graphite iron (SGI), aluminum, etc. In detail, some of the elements may be formed by steel, some of the elements may be formed by SGI and some elements may be formed by aluminum. Other metal materials and combinations thereof are of course also conceivable.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

EXAMPLE LIST

Example 1: A vehicle deformation structure for protecting vehicle electric driveline components during a collision, the vehicle deformation structure comprising:

a pair of front frame elements, each of the front frame elements extending vertically between a first end portion and a second end portion of the front frame element, a pair of rear frame elements, each of the rear frame elements extending vertically between a first end portion and a second end portion of the rear frame element, a pair of intermediate frame elements, wherein a first intermediate frame element is positioned between a first front frame element and a first rear frame element, and a second intermediate frame element is positioned between a second front frame element and a second rear frame element, each of the intermediate frame elements extending vertically between a first end portion and a second end portion of the intermediate frame element, and a pair of diagonally extending frame elements, wherein a first diagonally extending frame element extends between the first end portion of the first front frame element and the second end portion of the first rear frame element, and a second diagonally extending frame element extends between the first end portion of the second front frame element and the second end portion of the second rear frame element, wherein the first diagonally extending frame element is attached to the first intermediate frame element at a position between the first and second end portions of the first intermediate frame element, and the second diagonally extending frame element is attached to the second intermediate frame element at a position between the first and second end portions of the second intermediate frame element.

Example 2: The vehicle deformation structure of example 1, wherein the first end portion of each of the front frame elements, the rear frame elements and the intermediate frame elements is an upper end portion.

Example 3: The vehicle deformation structure of any one of examples 1 or 2, wherein the second end portion of each of the front frame elements, the rear frame elements and the intermediate frame elements is a lower end portion.

Example 4: The vehicle deformation structure of any one of the preceding examples, wherein the first diagonally extending frame element is attached to the first intermediate frame element at a first attachment position and the second diagonally extending frame element is attached to the second intermediate frame element at a second attachment position, wherein the distance from the first end portion of the first intermediate frame element to the first attachment position corresponds to the distance from the first end portion of the second intermediate frame element to the second attachment position.

Example 5: The vehicle deformation structure of any one of the preceding examples, wherein the vehicle deformation structure is connectable to a transverse cross member of the vehicle.

Example 6: The vehicle deformation structure of example 5, wherein the vehicle deformation structure comprises a pair of front suspension members configured to connect the vehicle deformation structure to the transverse cross member of the vehicle.

Example 7: The vehicle deformation structure of example 6, wherein a first front suspension member is arranged in the vicinity of the second end portion of the first front frame element and the second front suspension member is arranged in the vicinity of the second end portion of the second front frame element.

Example 8: The vehicle deformation structure of any one of the preceding examples, wherein the vehicle deformation structure is connectable to a pair of longitudinally extending frame rails of the vehicle.

Example 9: The vehicle deformation structure of example 8, wherein the vehicle deformation structure comprises a pair of rear suspension members configured to connect the vehicle deformation structure to the longitudinally extending frame rails of the vehicle.

Example 10: The vehicle deformation structure of example 10, wherein a first rear suspension member is arranged in the vicinity of the second end portion of the first rear frame element and a second rear suspension member is arranged in the vicinity of the second end portion of the second rear frame element.

Example 11: The vehicle deformation structure of any one of the preceding examples, further comprising a first upper longitudinally extending frame element attached to the first end portion of the first front frame element and to the first end portion of the first rear frame element.

Example 12: The vehicle deformation structure of example 11, wherein the first upper longitudinally extending frame element is attached to the first end portion of the first intermediate frame element.

Example 13: The vehicle deformation structure of any one of the preceding examples, further comprising a second upper longitudinally extending frame element attached to the first end portion of the second front frame element and to the first end portion of the second rear frame element.

Example 14: The vehicle deformation structure of example 11, wherein the second upper longitudinally extending frame element is attached to the first end portion of the second intermediate frame element.

Example 15: The vehicle deformation structure of any one of the preceding examples, further comprising a first lower longitudinally extending frame element attached to the second end portion of the first front frame element and to the second end portion of the first rear frame element.

Example 16: The vehicle deformation structure of example 15, wherein the first lower longitudinally extending frame element is attached to the second end portion of the first intermediate frame element.

Example 17: The vehicle deformation structure of any one of the preceding examples, further comprising a second lower longitudinally extending frame element attached to the second end portion of the second front frame element and to the second end portion of the second rear frame element.

Example 18: The vehicle deformation structure of example 17, wherein the second lower longitudinally extending frame element is attached to the second end portion of the second intermediate frame element.

Example 19: The vehicle deformation structure of any one of the preceding examples, further comprising a front transverse frame element attached to the first end portion of the first front frame element and to the first end portion of the second front frame element.

Example 20: The vehicle deformation structure of any one of the preceding examples, further comprising a rear transverse frame element attached to the first end portion of the first rear frame element and to the first end portion of the second rear frame element.

Example 21: The vehicle deformation structure of any one of the preceding examples, further comprising an intermediate transverse frame element attached to the first end portion of the first intermediate frame element and to the first end portion of the second intermediate frame element.

Example 22: A vehicle, comprising at least one electric traction motor, and a vehicle deformation structure according to any one of the preceding examples, wherein at least one driveline component connected to the at least one electric traction motor is arranged in the vehicle deformation structure.

The invention claimed is:

1. A vehicle deformation structure for protecting vehicle electric driveline components during a collision, the vehicle deformation structure comprising:

a pair of front frame elements, each of the front frame elements extending vertically between a first end portion and a second end portion of the front frame element;

a pair of rear frame elements, each of the rear frame elements extending vertically between a first end portion and a second end portion of the rear frame element;

a pair of intermediate frame elements, wherein a first intermediate frame element is positioned between a first front frame element and a first rear frame element, and a second intermediate frame element is positioned between a second front frame element and a second rear frame element, each of the intermediate frame elements extending vertically between a first end portion and a second end portion of the intermediate frame element; and a pair of diagonally extending frame elements, wherein a first diagonally extending frame element extends between the first end portion of the first front frame element and the second end portion of the first rear frame element, and a second diagonally extending frame element extends between the first end portion of the second front frame element and the second end portion of the second rear frame element, wherein the first diagonally extending frame element is attached to the first intermediate frame element at a position between the first and second end portions of the first intermediate frame element, and the second diagonally extending frame element is attached to the second intermediate frame element at a position between the first and second end portions of the second intermediate frame element.

2. The vehicle deformation structure of claim 1, wherein the first end portion of each of the front frame elements, the rear frame elements and the intermediate frame elements is an upper end portion.

3. The vehicle deformation structure of claim 1, wherein the second end portion of each of the front frame elements, the rear frame elements and the intermediate frame elements is a lower end portion.

4. The vehicle deformation structure of claim 1, wherein the first diagonally extending frame element is attached to the first intermediate frame element at a first attachment position and the second diagonally extending frame element is attached to the second intermediate frame element at a second attachment position, wherein the distance from the first end portion of the first intermediate frame element to the first attachment position corresponds to the distance from the first end portion of the second intermediate frame element to the second attachment position.

5. The vehicle deformation structure of claim 1, wherein the vehicle deformation structure is connectable to a transverse cross member of the vehicle.

6. The vehicle deformation structure of claim 5, wherein the vehicle deformation structure comprises a pair of front suspension members configured to connect the vehicle deformation structure to the transverse cross member of the vehicle.

7. The vehicle deformation structure of claim 6, wherein a first front suspension member is arranged in the vicinity of the second end portion of the first front frame element and the second front suspension member is arranged in the vicinity of the second end portion of the second front frame element.

8. The vehicle deformation structure of claim 1, wherein the vehicle deformation structure is connectable to a pair of longitudinally extending frame rails of the vehicle.

9. The vehicle deformation structure of claim 8, wherein the vehicle deformation structure comprises a pair of rear suspension members configured to connect the vehicle deformation structure to the longitudinally extending frame rails of the vehicle.

10. The vehicle deformation structure of claim 9, wherein a first rear suspension member is arranged in the vicinity of the second end portion of the first rear frame element and a second rear suspension member is arranged in the vicinity of the second end portion of the second rear frame element.

11. The vehicle deformation structure of claim 1, further comprising a first upper longitudinally extending frame element attached to the first end portion of the first front frame element and to the first end portion of the first rear frame element.

12. The vehicle deformation structure of claim 1, further comprising a second upper longitudinally extending frame element attached to the first end portion of the second front frame element and to the first end portion of the second rear frame element.

13. The vehicle deformation structure of claim 1, further comprising a first lower longitudinally extending frame element attached to the second end portion of the first front frame element and to the second end portion of the first rear frame element.

14. The vehicle deformation structure of claim 1, further comprising a second lower longitudinally extending frame element attached to the second end portion of the second front frame element and to the second end portion of the second rear frame element.

15. A vehicle, comprising at least one electric traction motor, and the vehicle deformation structure of claim 1, wherein at least one driveline component connected to the at least one electric traction motor is arranged in the vehicle deformation structure.

* * * * *